US 6,725,145 B1

(12) United States Patent
Takahashi

(10) Patent No.: US 6,725,145 B1
(45) Date of Patent: Apr. 20, 2004

(54) CURVE APPROACH CONTROL APPARATUS

(75) Inventor: Akira Takahashi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/659,057

(22) Filed: Sep. 11, 2000

(30) Foreign Application Priority Data

Sep. 14, 1999 (JP) ........................................ P.11-261045

(51) Int. Cl.[7] ........................ H04B 7/185; G06F 165/00
(52) U.S. Cl. ............................ 701/70; 701/72; 340/438
(58) Field of Search ................................ 701/1, 70, 72; 340/438, 437, 441, 466, 467; 303/140, 189

(56) References Cited

U.S. PATENT DOCUMENTS

| 3,778,763 A | * | 12/1973 | Johns et al. ................... 340/55 |
| 4,361,202 A | * | 11/1982 | Minovitch ................... 180/168 |
| 4,401,181 A | * | 8/1983 | Schwarz ....................... 180/168 |
| 5,539,397 A | * | 7/1996 | Asanuma et al. ............. 340/901 |
| 5,552,990 A | * | 9/1996 | Ihara et al. .................... 364/444 |
| 5,661,650 A | * | 8/1997 | Sekine et al. ............. 364/424.027 |
| 5,667,033 A | * | 9/1997 | Shimizu et al. ............... 180/272 |
| 5,710,704 A | * | 1/1998 | Graber ................ 364/426.027 |
| 5,757,949 A | * | 5/1998 | Kinoshita et al. ............. 382/104 |
| 5,862,503 A | * | 1/1999 | Eckert et al. ................... 701/78 |
| 5,913,376 A | * | 6/1999 | Takei ........................ 180/168 |
| 5,978,731 A |   | 11/1999 | Matsuda ..................... 701/208 |
| 6,049,749 A | * | 4/2000 | Kobayashi .................... 701/49 |
| 6,067,497 A | * | 5/2000 | Sekine et al. ................. 701/93 |
| 6,141,617 A | * | 10/2000 | Matsuda et al. ............... 701/72 |
| 6,188,316 B1 | * | 2/2001 | Matsuno et al. ............. 340/441 |
| 6,199,011 B1 | * | 3/2001 | Matsuda ..................... 701/208 |
| 6,208,927 B1 | * | 3/2001 | Mine et al. .................... 701/70 |
| 6,223,124 B1 | * | 4/2001 | Matsuno et al. ............. 701/209 |

FOREIGN PATENT DOCUMENTS

| DE | 197 49 916 A1 | 5/1998 |
| JP | 4-236699 | 8/1992 |
| JP | 8-2274 | 1/1996 |
| JP | 11-83501 | 3/1999 |

\* cited by examiner

Primary Examiner—Tan Q. Nguyen
Assistant Examiner—Dalena Tran
(74) Attorney, Agent, or Firm—Smith, Gambrell & Russell, LLP

(57) ABSTRACT

In a curve approach control apparatus that uses road information from the navigation device to perform an alarm control or a deceleration control on a curve in front, when it is decided that the driver is going to travel straight as he or she passes through the curve, the alarm control or the deceleration control is inhibited.

15 Claims, 7 Drawing Sheets

FIG.2

| | | DATA ON NODE IMMEDIATELY AFTER CAR | | | |
|---|---|---|---|---|---|
| START | NUMBER OF NODES OUTPUT n | CAR POSITION, EAST LONGITUDE | CAR POSITION, NORTH LATITUDE | NODE POSITION FROM CAR (EAST LONGITUDE) | NODE POSITION FROM CAR (NORTH LATITUDE) | INTER-SECTION FLAG | ROAD KIND | ROAD WIDTH |

DATA ON NODE IMMEDIATELY BEFORE CAR / DATA ON NODE TWO NODES IN FRONT OF CAR

| NODE POSITION FROM CAR (EAST LONGITUDE) | NODE POSITION FROM CAR (NORTH LATITUDE) | INTER-SECTION FLAG | ROAD KIND | ROAD WIDTH | NODE POSITION FROM CAR (EAST LONGITUDE) | NODE POSITION FROM CAR (NORTH LATITUDE) | INTER-SECTION FLAG | ROAD KIND | ROAD WIDTH |

DATA ON NODE(N-1) NODES IN FRONT OF CAR

| ... | NODE POSITION FROM CAR (EAST LONGITUDE) | NODE POSITION FROM CAR (NORTH LATITUDE) | INTER-SECTION FLAG | ROAD KIND | ROAD WIDTH | END |

CURVE APPROACH CONTROL APPARATUS

BACKGROUND OF THE INVENTION

1. Field of the Invention

The present invention relates to a curve approach control apparatus which enables a car to negotiate a curved road at an appropriate speed.

2. Description of the Related Art

Many curve approach control apparatus have been proposed which use road map data in a navigation device to detect an overspeed state of a car with respect to a curve in front and activate an alarm or deceleration control. For example, Japanese Patent Unexamined Publication No. Hei. 4-236699 (JP-A-4-236699) discloses a technology which determines an appropriate approach speed at which to enter the curve based on a radius of curvature of a curve in a travel path (guided path) set in the navigation device according to an input from a driver and on detected road surface conditions and, when an actual car speed is higher than the calculated value of the appropriate approach speed, issues an alarm to alert the driver to the need for reducing the car speed, or automatically activates a car speed reduction means in combination with the alarm.

The navigation device, when the guided path is not set, estimates a path that the car will travel according to a road kind and a road width and outputs node data on the estimated path to the curve approach control apparatus.

Where a path that turns left or right at an intersection is set as a guided path or estimated path (generally referred to as a set path) in the navigation device, the driver may travel in a direction different from the set path. In such a case, the technology of JP-A-4-236699 described above continues the alarm or deceleration control for a while as the car moves through the intersection. This control makes the driver feel incongruous.

SUMMARY OF THE INVENTION

The present invention has been accomplished under this circumstance and provides a curve approach control apparatus which prevents unnecessary alarm or deceleration while passing through an intersection and thereby avoids giving a sense of incongruity to the driver.

To solve the above problem, in a curve approach control apparatus according to the first aspect of the present invention, which uses road information from a navigation device to perform an alarm control or a deceleration control on a curve in front, when it is decided that a driver is going to travel straight through the curve, the alarm control or the deceleration control is inhibited.

In a second aspect according to the present invention, when a straight travel state of a car is detected, it is decided that the driver is going to travel straight.

In a third aspect according to the present invention, the straight travel state is judged by comparing an actual measured value of a turning motion parameter of a car and an estimated value of a turning motion estimated from a car speed and a curve's radius of curvature.

In a fourth aspect according to the present invention, the turning motion parameter is a yaw rate.

In a fifth aspect according to the present invention, the turning motion parameter is a lateral acceleration.

In a sixth aspect according to the present invention, the turning motion parameter is a steering wheel angle.

In a seventh aspect according to the invention, when the car is in an accelerating state, it is decided that the driver is going to travel straight.

BRIEF DESCRIPTION OF THE DRAWINGS

FIG. 2 is an explanatory diagram showing a format of data output from the navigation device to the control unit;

DETAILED DESCRIPTION OF THE PREFERED EMBODIMENTS

Figure 1:
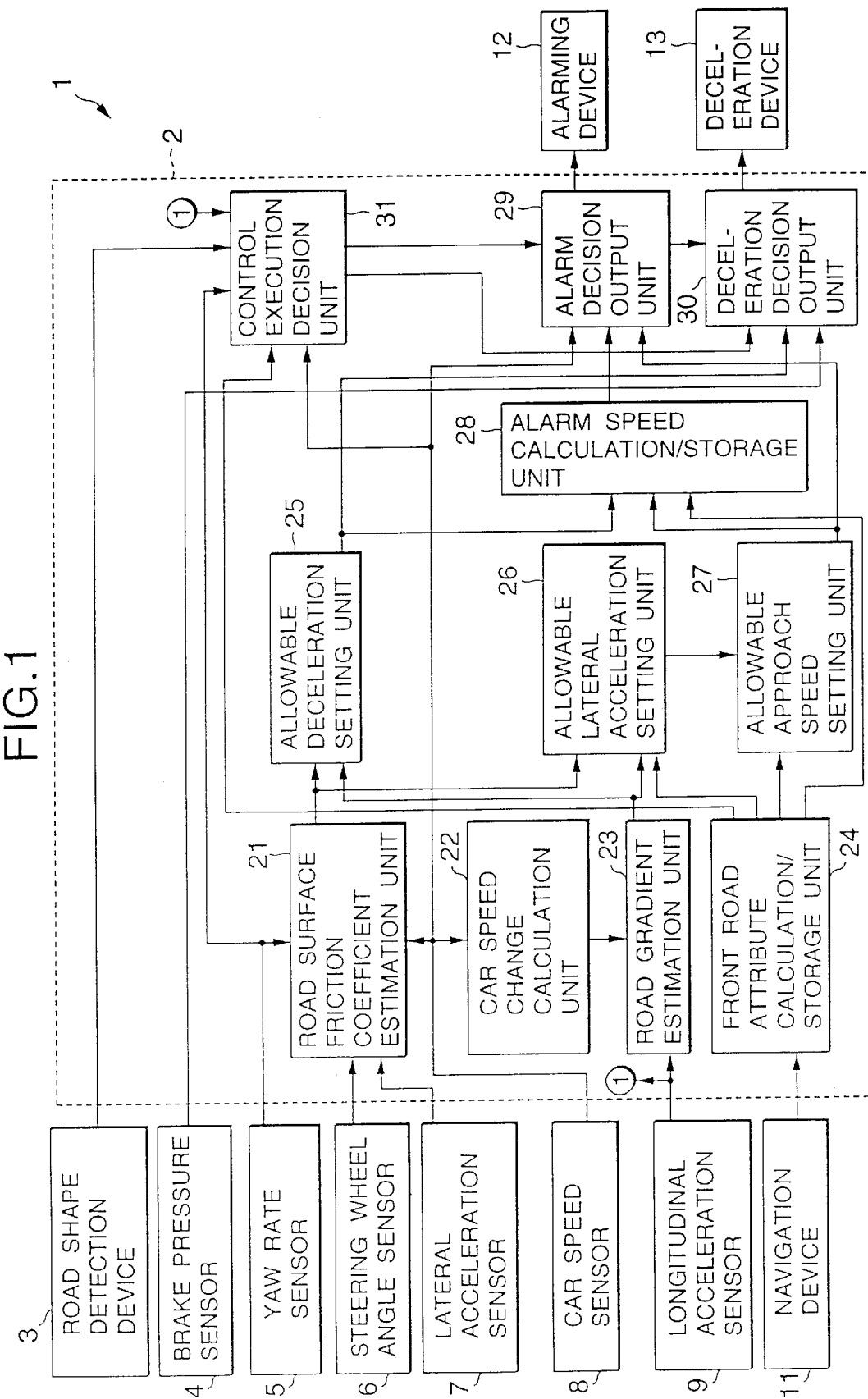
FIG. 1 is a functional block diagram of a curve approach control apparatus.
Figure 3:
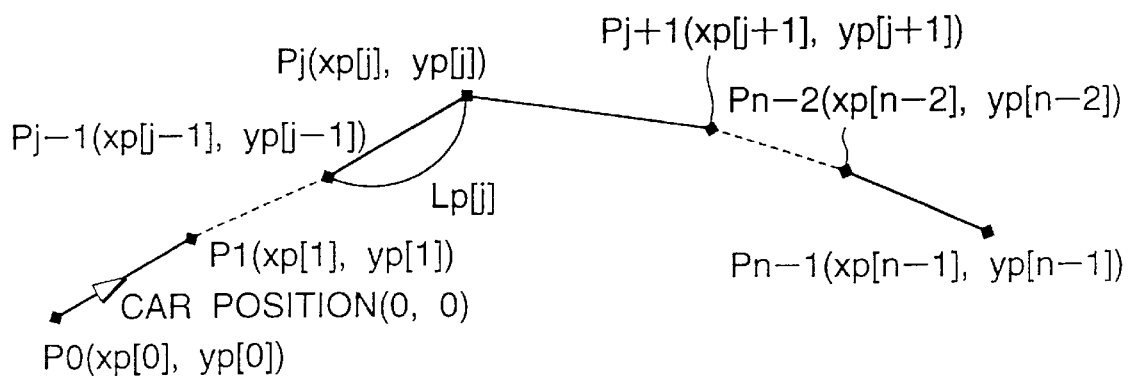
FIG. 3 is an explanatory diagram a car position and nodes.
Figure 4:
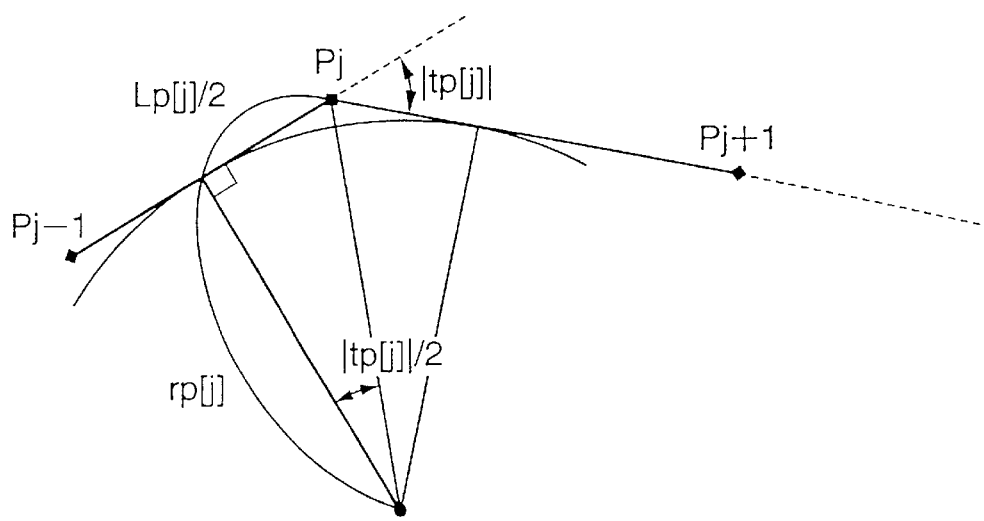
FIG. 4 is an explanatory diagram showing how a node angle and a curve's radius of curvature are calculated.
Figure 5:
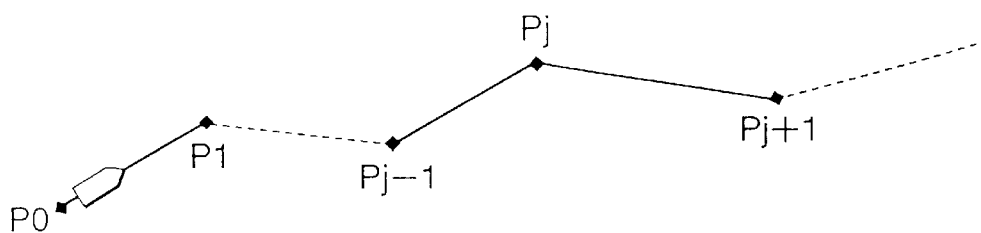
FIG. 5 is an explanatory diagram showing an example of a curve made up of a single node.
Figure 6:
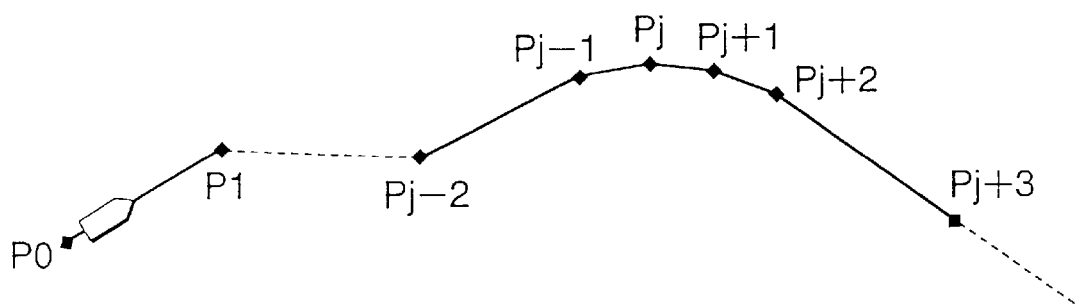
FIG. 6 is an explanatory diagram showing an example of a curve made up of a plurality of nodes.
Figure 7:
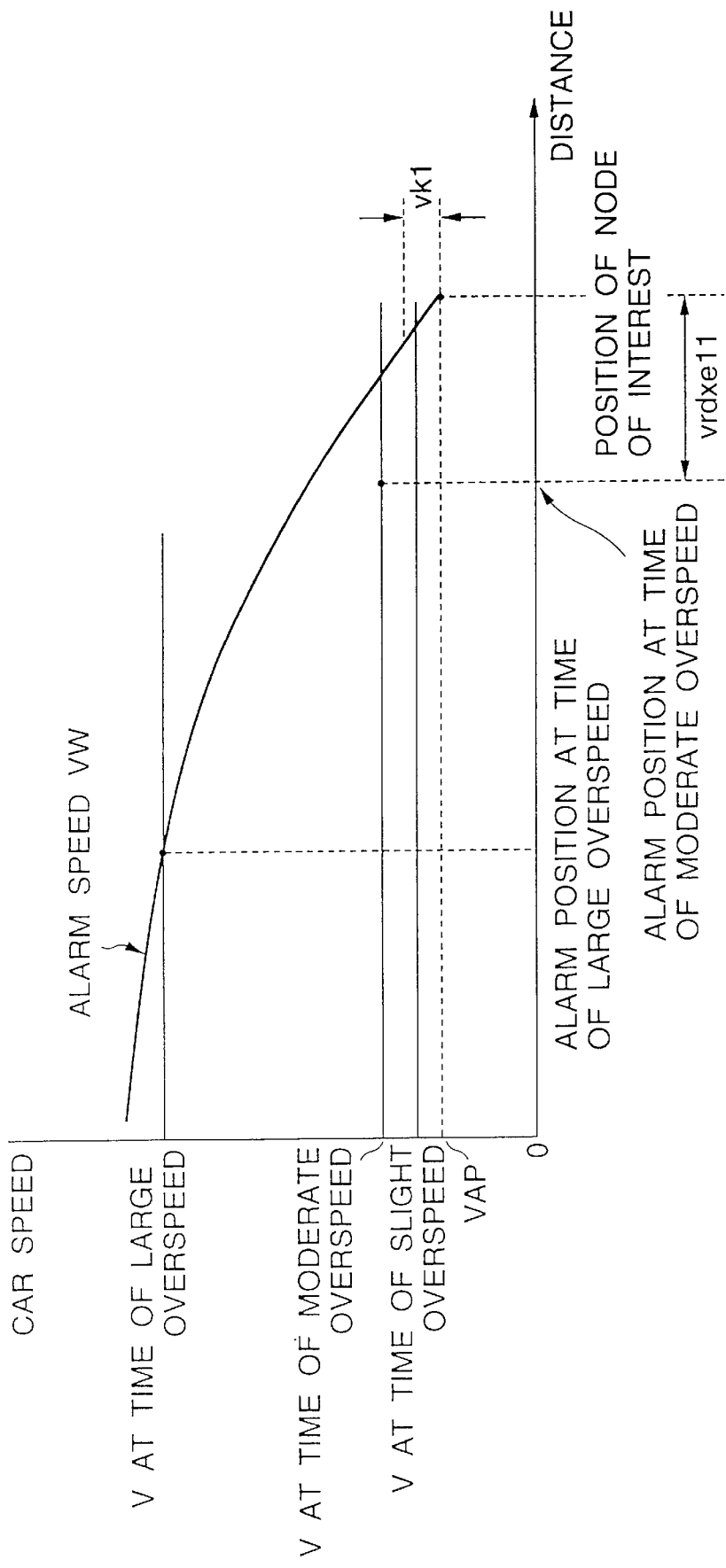
FIG. 7 is a diagram showing a relation between a distance to a node of interest and an alarm speed.
Figure 8:
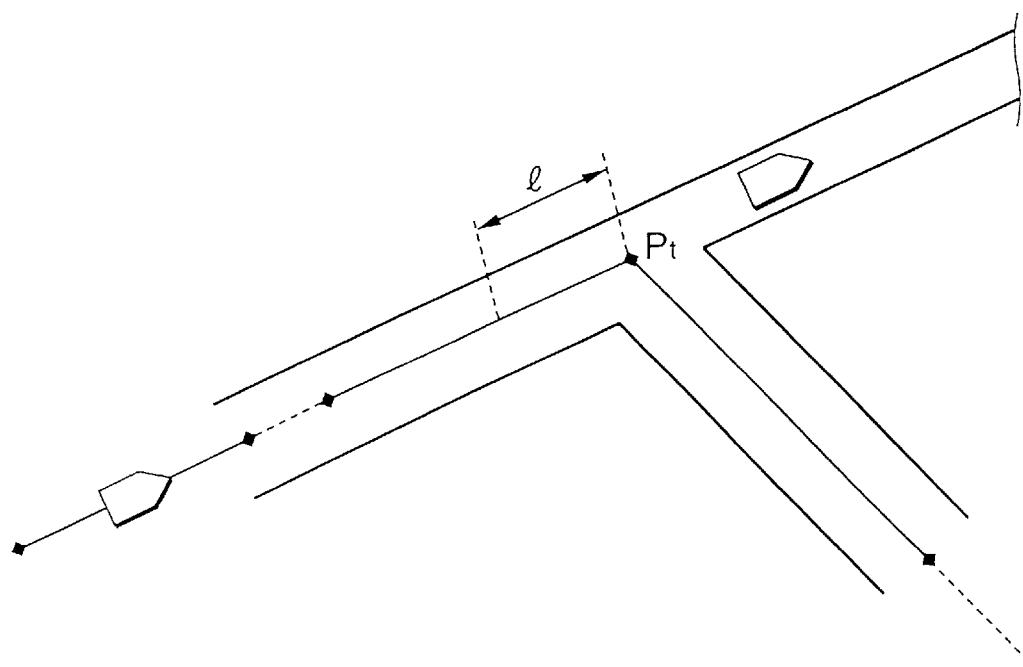
FIG. 8 is an explanatory diagram showing a branch point on a guided path.
Figure 9:
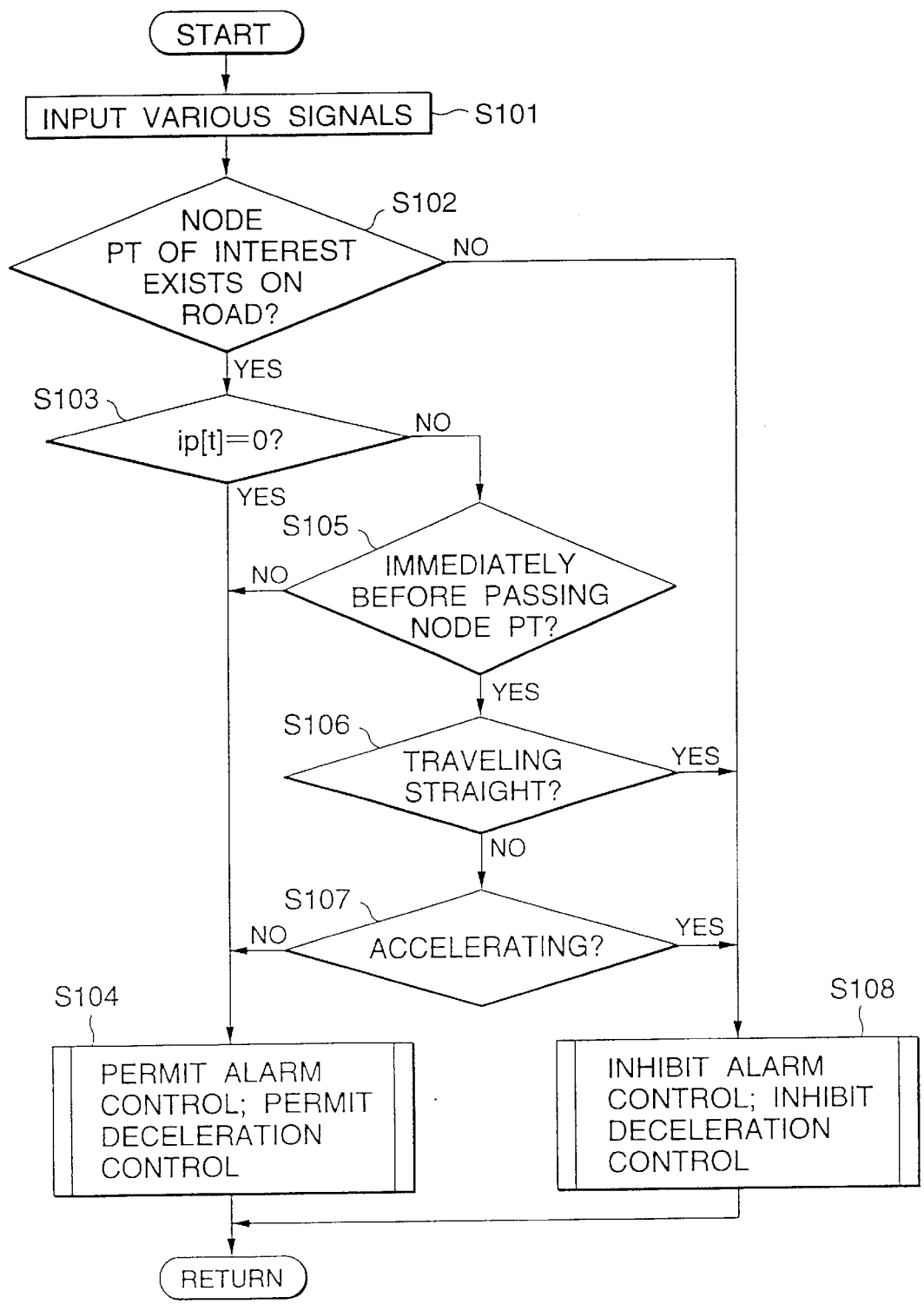
FIG. 9 is a flow chart showing a control execution decision routine.

Now, an embodiment of the present invention will be described by referring to the accompanying drawings. The drawings concern one embodiment. FIG. 1 is a functional block diagram of a curve approach control apparatus. FIG. 2 is an explanatory view showing a format of data output from the navigation device to the control unit. FIG. 3 is an explanatory view showing a car position and nodes. FIG. 4 is an explanatory view showing how a node angle and a curve's radius of curvature are calculated. FIG. 5 is an explanatory view showing an example case in which a curve is made up of a single node. FIG. 6 is an explanatory view showing an example case in which a curve is made up of a plurality of nodes. FIG. 7 is a diagram showing a relation between a distance to a node of interest and an alarm speed. FIG. 8 is an explanatory diagram showing a branch point on a guided path. FIG. 9 is a flow chart showing a control execution decision routine.

In FIG. 1, reference numeral 1 represents a curve approach control apparatus. A control unit 2 of the curve approach control apparatus 1 is connected with sensors, such as brake pressure sensor 4, yaw rate sensor 5, steering wheel angle sensor 6, lateral acceleration sensor 7, car speed sensor 8 and longitudinal acceleration sensor 9, and receives signals detected by these sensors, such as driver's brake application force, yaw rate, steering wheel angle, lateral acceleration, car speed and longitudinal acceleration.

The control unit 2 is also connected with a road shape detection device 3 and receives information on the curve geometry of a road in front.

The road shape detection device 3 has, for example, a pair of CCD cameras that photograph an image of the front road in stereo. The road shape detection device 3 processes the road image to recognize a white line, a guardrail, a road side boundary and others and detect a distance to a point where the road in front begins to curve and a degree of the curve (large right curve, moderate right curve, almost straight curve, moderate left curve, and large left curve).

The control unit 2 is also connected with a navigation device 11, which issues, every 500 ms for example, information including a node number n along a car travel route, an east longitude and a north latitude of car position, data on a node directly after the car, and data on nodes within a set range of the car travel route in front of the car (data on a node directly before the car, data on a second node in front of the car, . . . , data on an (n−1)th node in front of the car). In this case, data on each node includes, as shown, information such as an eastward distance from the car position to the node, an northward distance from the car position to the node, an intersection flag indicating whether there is an intersection at the node position, a road kind or category, and a road width.

When the driver inputs a destination, the navigation device 11 sets an optimum guided path along which the car should travel to reach the input destination. Then, the navigation device 11 outputs to the control unit 2 data on nodes on the set guided path up to 300 m ahead of the car and data on a node immediately after the car as node data of the car travel route.

When on the other hand a destination is not entered by the driver, the navigation device 11 estimates the order of priority of paths that the car will travel, based on information such as road kind and road width, and sets a path having the highest priority as an estimated path. Then, the navigation device 11 outputs to the control unit 2 the data on the nodes on the set estimated path up to, for example, 300 m ahead of the car and the data on the node immediately after the car as the node data of the car travel route.

The navigation device 11 may set a guided path or estimated path that makes a turn at an intersection. In this invention, a right turn or left turn at an intersection is treated as a curve.

Based on inputs from the sensors 4, 5, 6, 7, 8, 9, 10, the road shape detection device 3 and the navigation device 11, the control unit 2 calculates whether the car can safely negotiate a curve of the road in front and, if necessary, issues an alarm to the driver through an alarming device 12 such as a buzzer/voice alarm generating device and alarm lamp. At the same time when a forced deceleration is required, the control unit 2 executes operations such as downshifting of a transmission, activating a brake and/or increasing a braking force through a deceleration device 13 such as transmission control device and brake control device. For that purpose, the control unit 2 comprises a road surface friction coefficient estimation unit 21, a car speed change calculation unit 22, a road gradient estimation unit 23, a front road attribute calculation/storage unit 24, an allowable deceleration setting unit 25, an allowable lateral acceleration setting unit 26, an allowable approach speed setting unit 27, an alarm speed calculation/storage unit 28, an alarm decision output unit 29, a deceleration decision output unit 30, and a control execution decision unit 31.

Based on the yaw rate from the yaw rate sensor 5, the steering wheel angle from the steering wheel angle sensor 6, the lateral acceleration from the lateral acceleration sensor 7 and the car speed from the car speed sensor 8, the road surface friction coefficient estimation unit 21 estimates the road surface friction coefficient $\mu$ while the car is traveling. The result of calculation is output to the allowable deceleration setting unit 25. The method of estimating the road surface friction coefficient $\mu$ is detailed in Japanese Patent Unexamined Publication No. Hei. 8-2274(JP-A-8-2274) filed by the applicant of this invention.

Based on the car speed from the car speed sensor 8, the car speed change calculation unit 22 calculates a rate of change of the car speed every set duration of time and outputs the calculated result to the road gradient estimation unit 23.

The road gradient estimation unit 23, based on the longitudinal acceleration from the longitudinal acceleration sensor 9 and the rate of change of the car speed from the car speed change calculation unit 22, estimates the road gradient SL and outputs the calculated result to the allowable deceleration setting unit 25 and the allowable lateral acceleration setting unit 26. The method of estimating the road gradient SL is detailed in Japanese Patent Unexamined Publication No. Hei. 11-83501(JP-A-11-83501) filed by the applicant of this invention.

Based on the position information for each node sent from the navigation device 11, the front road attribute calculation/storage unit 24 calculates an interval to an immediately preceding node, a curve's radius of curvature and a node angle, stores these data as node attribute information, and also stores information on intersection identification, road kind, road width and singular point identification described later as attribute information for each node.

That is, the front road attribute calculation/storage unit 24 uses the node coordinates (see FIG. 3) with the car position as a reference, which are output from the navigation device 11, to calculate an interval $Lp[j]$ between the node Pj and the immediately preceding node Pj−1 from the following equation:

$$Lp[j]=\{(xp[j]-xp[j-1])^2+(yp[j]-yp[j-1])^2\}^{1/2} \text{ (where } 1\leq j\leq n-1)$$

Next, the front road attribute calculation/storage unit 24, as shown in FIG. 4, calculates the node angle tp[j] at each node Pj from the following equation using the node coordinates.

$$tp[j]=\sin^{-1}[\{(xp[j-1]-xp[j])(yp[j]-yp[j+1]) -(xp[j]-xp[j+1])(yp[j-1]-yp[j])\}/(Lp[j]Lp[j+1])]$$

Based on the result of calculation described above, the front road attribute calculation/storage unit 24 calculates the curve's radius of curvature rp[j] from the following equation:

$$rp[j]=\min (Lp[j], Lp[j+1])/2/\tan (|tp[j]|/2)$$

Further, the front road attribute calculation/storage unit 24 uses, as is, the intersection flag sent from the navigation device 11 to set an intersection identification ip[j].

The front road attribute calculation/storage unit 24 sets the intersection identification ip[j] as follows:

when an intersection exists at the node position, ip[j]=1; and when an intersection does not exist at the node position, ip[j]=0.

Particularly when an intersection exists at a node position on a guided path leading to a destination that was input by the driver, ip[j]=2 is set.

Further, the front road attribute calculation/storage unit 24 uses, as is, the road kind data sent from the navigation device 11 to set a road kind attribute cp[j].

The front road attribute calculation/storage unit 24 sets the road kind attribute cp[j] as follows:

For national expressways, cp[j]=5

For city expressways, cp[j]=4

For general national roads, cp[j]=3

For main local roads, cp[j]=2

For other roads, cp[j]=1

Further, the front road attribute calculation/storage unit 24, based on a flag concerning the road width sent from the navigation device 11, sets and stores a road width attribute wp[j] as follows:

when a flag "4" indicating that the road width is 13 m or more is entered, wp[j]=15 m;

when a flag "3" indicating that the road width is 5.5 to 13 m is entered, wp[j]=10 m;

when a flag "2" indicating that the road width is 3 to 5.5 m is entered, wp[j]=5 m;

when a flag "1" indicating that the road width is 3 m or less is entered, wp[j]=3 m; and when a flag "0" indicating that the road width is not yet surveyed, wp[j]=5 m.

Further, the front road attribute calculation/storage unit 24 checks every node sent from the navigation device 11 for singularity and, when the node Pj is judged as a singular point, calculates again a node angle tp[j+1] and a curve's radius of curvature rp[j+1] between a node Pj−1 immediately before the node Pj and a node Pj+1 immediately after the node Pj by excluding the singular point node Pj.

That is, when the adjacent nodes are too close to each other, the calculated curve's radius of curvature becomes far smaller than the radius of curvature of the actual road, giving rise to a possibility that overly sensitive alarm control and deceleration control may be performed at a moderate curve. To prevent this, the front road attribute calculation/storage unit 24 excludes such a node as a singular point from the calculation of the node angle and the curve's radius of curvature.

The decision on singularity is made based on the node interval Lp[j] and node angle tp[j] by considering the road kind attribute cp[j] and road width attribute wp[j]. That is, there is a general tendency that as the road width widens as in expressways, the number of sharp curves decreases and that as the road width narrows as in local roads, the number of sharp curves increases. Hence, as the values of the road kind attribute cp[j] and the road width attribute wp[j] increase, the front road attribute calculation/storage unit 24 renders it more likely or easier to determine a node as a singular point, thus enabling an appropriate singularity decision.

The allowable deceleration setting unit 25 sets an allowable deceleration XgLim that the car can tolerate, based on the road surface friction coefficient $\mu$ and the road gradient SL.

That is, the allowable deceleration setting unit 25 determines a reference value XgLim0 based on the present road surface friction coefficient $\mu$ and then corrects the reference value XgLim0 with the road gradient SL to determine the allowable deceleration XgLim. The method of calculating the allowable deceleration XgLim is detailed in JP-A-11-83501 filed by the applicant of the present invention.

The allowable lateral acceleration setting unit 26 sets an allowable lateral acceleration ayl that the car can tolerate, based on the road surface friction coefficient $\mu$, the road gradient SL and the curve's radius of curvature rp[j].

That is, the allowable lateral acceleration setting unit 26 first calculates a reference value ayl1 of the allowable lateral acceleration ayl based on the road surface friction coefficient $\mu$. The method of calculating the reference value ayl1 is detailed in JP-A-11-83501 filed by the applicant of this invention.

Next, the allowable lateral acceleration setting unit 26 calculates an allowable lateral acceleration ayl2 from the following equation by correcting the reference value ayl1 with the road gradient SL.

$$ayl2=(ayl1^2-(g\cdot SL/100)^2)^{1/2}$$

Next, the allowable lateral acceleration setting unit 26 calculates an allowable lateral acceleration ayl from $$ayl=ayl2\cdot Kv$$

where Kv is a car speed correction coefficient corresponding to the curve approach limit speed $(ayl1/rp[j])^{1/2}$. The car speed correction coefficient takes a smaller value as the curve approach limit speed increases. That is, by performing the correction that reduces the allowable lateral acceleration as the curve approach limit speed increases, the safety with which the car corners at high speed is enhanced.

The allowable approach speed setting unit 27 is configured as an allowable approach speed setting means and calculates an allowable approach speed vap of the car for each node based on the node attribute information stored in the front road attribute calculation/storage unit 24 and the allowable lateral acceleration ayl set by the allowable lateral acceleration setting unit 26.

That is, the allowable approach speed setting unit 27 uses the allowable lateral acceleration ayl and the curve's radius of curvature rp[j] to determine the allowable approach speed reference value vap0[j] for each node Pj from the following equation.

$$vap0[j]=(ayl\cdot rp[j])^{1/2}$$

Next, the allowable approach speed setting unit 27 checks whether adjacent nodes make up the same curve.

In more concrete terms, there are two patterns in which a curve is formed: one in which a curve is made up of a single node Pj as shown in FIG. 5; and one in which a curve is made up of a plurality of nodes (in the example shown, Pj−1 to Pj+2) as shown in FIG. 6. To determine whether or not the adjacent nodes Pj−1 and Pj belong to the same curve, the allowable approach speed setting unit 27 checks whether the node interval Lp[j] is smaller than a predetermined value (LK·wp[j]) and whether the node angles tp[j−1], tp[j] have equal signs.

Next, the allowable approach speed setting unit 27 determines the depth of curve tpa for each node. The curve depth tpa is obtained by summing up the node angles of those nodes belonging to the same curve which precede and include the node of interest. For example, the curve depth of each node shown in FIG. 6 is as follows: tpa[j−1]=tp[j−1], tpa[j]=tp[j−1]+tp[j], tpa[j+1]=tp[j−1]+tp[j]+tpa[j+1], tpa[j+2]=tp[j−1]+tp[j]+tpa[j+1]+tpa[j+2]. In the example shown in FIG. 5, the curve depth of the node Pj is tpa[j]=tp[j].

Next, the allowable approach speed setting unit 27 uses the curve depth tpa to correct the allowable approach speed reference value vap0 for each node to determine the allowable approach speed vap1. The allowable approach speed vap1 can be determined, for example, from:

$$vap1=(\text{reference value } vap0)\cdot(\text{curve depth correction coefficient } Kt)$$

The curve depth correction coefficient Kt is set to decrease as the curve depth tpa increases.

Then, when the curve is tight, with the curve's radius of curvature rp[j] for each node less than a predetermined percentage rwk of the road width wp[j], the allowable approach speed setting unit 27 further corrects the allowable approach speed vap1 to determine an allowable approach speed vap2 in order to prevent the allowable approach speed from becoming extremely small. The allowable approach speed vap2 is set by comparing a predetermined value $(ayl\cdot wk\cdot rwk)^{1/2}$ corresponding to the road width with the allowable approach speed vap1 and selecting whichever is larger. That is, the allowable approach speed vap2 is determined from $$vap2=\max\{vap1, (ayl\cdot wk\cdot rwk)^{1/2}\}$$

Next, the allowable approach speed setting unit 27 smoothes out the allowable approach speeds vap2 of the nodes making up the same curve to determine a final allowable approach speed vap for each node.

In more concrete terms, the smoothing of the allowable approach speeds by the allowable approach speed setting unit 27 consists in: comparing three values, which are an allowable approach speed vap2[j] for the node Pj of interest among the nodes making up the same curve, an average of the allowable approach speed vap2[j] and an allowable approach speed vap2 [j+1] for the next node Pj+1, and an average of the allowable approach speed vap2[j] and an allowable approach speed vap2[j−1] for the preceding node Pj−1; and setting a median value of the three values as a final allowable approach speed vap for the node Pj.

For all of the n nodes sent from the navigation device 11, excluding the node P0 immediately after the car, the farthest node Pn−1 and the singular node, the alarm speed calculation/storage unit 28 uses the node interval Lp[j], allowable deceleration XgLim and allowable approach speed vap[j] to calculate an alarm speed vw[j] that constitutes a reference for the alarm control.

The alarm speed vw[j] is set such that when the car is decelerated by 50% of the allowable deceleration XgLim when the car travels from the present car position to the node Pj of interest, the car speed will become the allowable approach speed vap[j]. The alarm speed vw[j] can be determined from $$vw[j]=(vap[j]^2+2\cdot(0.5\cdot XgLim)LL[j])^{1/2}$$

where LL[j] is a distance from the car position to the node Pj and can be determined as follows:

When j=1, $LL[1]=(xp[1]^2+yp[1]^2)^{1/2}$

When $2\leq j\leq n-1$, LL[j]=LL[1]+Lp[2]+Lp[3]+. . . +Lp[j]

The alarm decision output unit 29 is formed as a decision output means and decides whether it is necessary to output an alarm, based on the car speed v detected by the car speed sensor 8, the allowable approach speed vap[j] set for each node by the allowable approach speed setting unit 27 and the alarm speed vw[j] calculated for each node by the alarm speed calculation/storage unit 28. Then, when the alarm decision output unit 29 decides that it is necessary to output an alarm and receives an enable signal for executing the alarm control from the control execution decision unit 31, the alarm decision output unit 29 outputs a control signal to the alarming device 12 to execute the alarm control.

In more concrete terms, the alarm decision output unit 29 sets as a node of interest Pt (curve representative node) for executing the alarm control the node which has a minimum alarm speed vw[j] calculated by the alarm speed calculation/ storage unit 28 and, as shown in FIG. 7, compares the alarm speed vw[t] at the node Pt with the car speed v entered from the car speed sensor 8. When the car speed v is larger than the alarm speed vw[t] and a difference between the allowable approach speed vap[t] at the node [Pt] of interest and the car speed v is equal to or more than a predetermined value vk1 (for example, 5 km/h), the alarm decision output unit 29 decides that the car is running in an overspeed state and that it is necessary to issue an alarm.

When the difference between the car speed v and the allowable approach speed vap[t] at the node Pt of interest is equal to or more than the predetermined value vk1 but when the car speed v is still not in excess of the alarm speed vw[t] and the distance LL[t] to the node Pt of interest is equal to or less than a predetermined value vrdxell, the alarm decision output unit 29 decides that the car is running in an overspeed state and that it is necessary to output an alarm. Here, the predetermined value vrdxell is a function of car speed and takes a greater value as the car speed increases. For example, it is set to vrdxell=2·v (=distance traveled for two seconds).

The deceleration decision output unit 30 is formed as a decision output means and checks whether a forced deceleration is required for the node Pt of interest for which the alarm decision output unit 29 has decided that an alarm output is necessary. When the driver has not performed an appropriate deceleration operation for a predetermined period (for example, two seconds) after the alarm decision output unit 29 has decided that it is necessary to output an alarm to the node Pt of interest, the deceleration decision output unit 30 decides that it is necessary to perform the deceleration operation on this node Pt. When the deceleration decision output unit 30 decides that the deceleration is required and receives a deceleration control execution enable signal from the control execution decision unit 31, the deceleration decision output unit 30 outputs a control signal to the deceleration device 13 to execute the deceleration control.

The control execution decision unit 31 is formed as a control execution decision means and makes a decision on whether an alarm control on the node Pt of interest should be executed and also on whether a deceleration control should be performed on the node Pt of interest.

The decision made by the control execution decision unit 31 follows the flow chart of FIG. 9. First, at step 101 (or S101) the control execution decision unit 31 reads signals from various sensors and from the road shape detection device 3, car speed change calculation unit 22, front road attribute calculation/storage unit 24, alarm speed calculation/storage unit 28, alarm decision output unit 29, and deceleration decision output unit 30.

Next, the program proceeds to S102 where it checks whether the node Pt of interest set by the alarm decision output unit 29 actually exists on the road, i.e., whether a road made up of nodes including the node of interest actually exists. This decision is made by comparing the information on the node Pt of interest (a curve's radius of curvature rp[t] and a distance LL[t]) with the information on the road in front detected by the road shape detection device 3 (a degree of curve in front and a distance to the curve start point of the road in front).

Then when at step S102 the information on the node Pt of interest based on the node data sent from the navigation device 11 and the information on the road in front detected by the road shape detection device 3 do not agree, it is highly likely that the road under consideration differs from the road information stored in the CD-ROM in the navigation device 11 due to extension or modification constructions of the road. In this case, it is decided that the node Pt of interest does not exist on the road and the program moves to S109 where it inhibits the alarm decision output unit 29 from executing the alarm control and the deceleration decision output unit 30 from executing the deceleration control, before exiting the routine.

On the other hand, when at the step S102 the information on the node Pt of interest output from the navigation device 11 and the information on the road in front detected by the road shape detection device 3 agree and it is decided that the node Pt of interest actually exists on the road, the program moves to step S103 where it checks whether the intersection identification ip[t] of the node Pt is "0", i.e., whether the curve in front is an intersection or not.

Then, when at step S103 the intersection identification is ip[t]=0, it is decided that the curve at the node Pt of interest is not an intersection and the program moves to steps S104 where it permits the alarm decision output unit 29 to execute the alarm control and the deceleration decision output unit 30 to execute the deceleration control, before existing the routine.

When, at step S103, the intersection identification is ip[t]≠0, it is decided that the intersection identification ip[t] is either "1" or "2" and the curve at the node Pt of interest is an intersection. The program them moves to step S105.

Step 105 checks whether the car is about to pass through the node Pt of interest which was decided to be an intersection. This decision is made by checking whether, of the node data supplied from the navigation device 11 and stored in the front road attribute calculation/storage unit 24, a node P1 immediately in front of the car is the node Pt of interest. The decision that the car is on the point of passing through the node Pt of interest may be made, for example, when the distance LL[t] from the car to the node Pt is smaller than a predetermined value 1 (see FIG. 8) set according to the car speed.

Then, when it is decided at step S105 that the car is not on the verge of passing through the node Pt of interest, the program proceeds to step S104 where it permits the alarm decision output unit 29 to execute the alarm control and the deceleration decision output unit 30 to execute the deceleration control, before exiting the routine.

Hence when the node Pt of interest is an intersection on the guided path or estimated path in the navigation device 11 and the car is not about to pass through the node Pt, i.e., when the car is approaching the node Pt, the alarm decision output unit 29 and the deceleration decision output unit 30 perform the alarm control and the deceleration control, respectively, on the curve at the node Pt.

When it is decided at S105 that the car is on the verge of passing through the node Pt of interest, it is checked at the next step S106 or S107 whether the driver is going to move straight on through the intersection (the node Pt). One example of this judgment at step S106 is to check whether the car is running in a straight line. At step S107 it is checked whether the car is accelerating, based on the car speed or longitudinal acceleration.

One example of the judgment made at S106 involves checking whether the actual yaw rate detected by the yaw rate sensor 5 is equal to or less than a predetermined percentage of the yaw rate (estimated yaw rate: v/rp[t]) estimated from the curve's radius of curvature rp[t] at the node Pt of interest and the car speed v. If so, it is decided that the car is running straight.

Instead of or in combination with this decision using the yaw rate, it is possible to make a comparison between the actual lateral acceleration and the estimated lateral acceleration ($v^2$/rp[t]) or between the actual steering wheel angle and the estimated steering wheel angle (N·L(1+A·$v^2$)/rp[t]; N=steering gear ratio, L=wheel base, and A=stability factor). That is, the decision at S106 as to whether the car is traveling straight is made based on the actual measurement and estimation of the turning motion parameter of the car.

If the step S106 decides, for example, that the actual yaw rate is equal to or less than the predetermined percentage of the estimated yaw rate and thus the car is running straight or if the step S107 decides that the car is accelerating, it is determined that the driver intends to move straight without making a turn at the intersection (node Pt of interest) as indicated by the guided or estimated path. The program then moves to S108 where it inhibits the alarm decision output unit 29 from executing the alarm control and the deceleration decision output unit 30 from executing the deceleration control, before exiting the routine.

Therefore, if the node Pt of interest is an intersection on the guided path or estimated path in the navigation device 11 and it is estimated that the driver will go straight contrary to the setting of the guided path or estimated path (turning left or right at the intersection), the alarm control and the deceleration control are inhibited.

If it is decided at step S106 that the actual yaw rate is equal to or higher than a predetermined percentage of the estimated yaw rate and the car is running in a turning state and if it is decided at step S107 that the car is not accelerating, this is interpreted to mean that the driver is going to make a turn as indicated by the guided path or estimated path. The program then moves to step S104 where it permits the alarm control and the deceleration control before exiting the routine.

In this embodiment of the present invention, when there is an intersection at the node Pt subject to the alarm control or the deceleration control and it is ascertained that the driver is going to travel straight through this intersection, the alarm control and the deceleration control are inhibited so that no alarm or deceleration which will make the driver feel incongruous will occur when the car passes through the intersection. That is, if the navigation device 11 sets a guided path or estimated path that makes a turn at the intersection, the alarm can be prevented from persisting as the car is passing through the node Pt of interest contrary to the guided path. And the deceleration control is also prevented from being executed against the will of the driver. The advantage of this control is significant when the alarm is issued in the form of a continuous sound of buzzer or chime or a continuous blinking of an alarm lamp.

In this embodiment of the present invention, when the curve at the node Pt of interest is an intersection, the will of the driver to travel straight through the intersection is checked. The present invention is not limited to this method and it is possible to inhibit the alarm control and the deceleration control by only checking that the driver is going to move straight through the curve at the node Pt without ascertaining that the curve in front is an intersection. In that case, the decision at S103 of FIG. 9 is omitted.

Further, in this invention, when the curve at the node Pt of interest is an intersection on the guided path set in the navigation device 11, i.e., when the intersection identification ip[t] is "2", it is possible to inhibit the alarm control and the deceleration control without checking whether the car is going to move straight through the intersection. This is based on the following consideration. If the guided path is set to turn at the intersection, the function of the navigation device 11 issues a voice guide concerning the intersection (for example, "turn right at the next intersection" is voiced when the voice guide function is active). Therefore, it is considered redundant to perform the alarm control and the deceleration control by the curve approach control apparatus 1.

As described above, this invention prevents unnecessary alarm and deceleration from being activated when the car is passing through an intersection, so that the driver will not feel incongruous.

While the presently preferred embodiment of the present invention has been shown and described, it is to be understood that this disclosure is for the purpose of illustration and that various changes and modifications may be made without departing from the scope of the invention as set forth in the appended claims.

What is claimed is:
1. A curve approach control apparatus comprising:
   vehicle running condition detecting means for detecting a vehicle running condition as the vehicle approaches a curve on a road where the driver has a choice of going straight or turning into the curve and where a set path for the vehicle is for turning into the curve, a controlling unit for controlling said vehicle based on at least said vehicle running condition so as to enable said vehicle to safely pass through a curve in front of said vehicle in the event the driver decides to turn into the curve instead of traveling straight on said road;

comparing means for comparing an actual measured value of a turning motion parameter of said vehicle and an estimated value of a turning motion parameter estimated from said vehicle speed and a curve's radius of curvature, and deciding means for determining a driver's intention based on said comparing means whether the driver intends to travel straight on the road or to turn into the curve in front of said vehicle based on said vehicle running condition, and for determining that the driver intends to travel straight when the actual measured value of a turning motion parameter of said vehicle is less than or equal to the estimated value of the turning motion parameter of the vehicle thereby indicating that a straight travel state is decided by the driver.

wherein said controlling unit, based on said deciding means determining a straight travel state, inhibits unnecessary execution of alarm or deceleration for controlling said vehicle in order to enable said vehicle to safely travel straight on said road when said deciding means determines that the driver intends to travel straight on said road and not enter the curve and when said controlling unit determines from running conditions of said vehicle that the driver intends to turn into the curve, said controlling unit permits alarm control and deceleration control.

2. The curve approach control apparatus according to claim 1, wherein the turning motion parameter is a yaw rate.

3. The curve approach control apparatus according to claim 1, wherein the turning motion parameter is a lateral acceleration.

4. The curve approach control apparatus according to claim 1, wherein the turning motion parameter is a steering wheel angle.

5. The curve approach control apparatus according to claim 1, wherein
said deciding means determines the driver intention to travel straight when said vehicle is in an accelerating state at a predetermined range in front of the curve.

6. The curve approach control apparatus according to claim 1, wherein
said deciding means determines whether the driver intends to travel straight without turning at an intersection.

7. The curve approach control apparatus according to claim 1, further comprising:
a navigation device for storing road map information and for navigating a driver whether said vehicle travels straight or into the curve,
wherein said controlling unit inhibits an execution of alarm or deceleration for controlling said vehicle when said deciding means determines that the driver intends to travel straight even if said navigation device guides the driver to drive into the curve.

8. The curve approach control apparatus according to claim 1, wherein
said controlling unit executes at least one of an alarm control and a deceleration control for the curve in front of the vehicle.

9. A method for curve approach control for a driver of a vehicle comprising:
detecting a vehicle running condition on a road approaching an intersection of a curve and a straight road:
controlling the performing of at least one of an alarm control and a deceleration control for a curve in front of a vehicle; and
deciding a driver's intention whether the driver intends to travel straight on said straight road or to turn into the curve based on said vehicle running condition,
said deciding a driver's intention to travel straight is carried out by comparing an actual measured value of a turning motion parameter of said vehicle and an estimated value of a turning motion estimated from said vehicle speed and a curve's radius of curvature and determining that the driver intends to travel straight when the actual measured value of a turning motion parameter of said vehicle is less than or equal to the estimated value of the turning motion parameter of the vehicle thereby indicating that a straight travel state is decided by the driver,
wherein said controlling, based on determining a straight travel state, inhibits an execution of at least one of the alarm control and the deceleration control when it is determined that the driver intends to travel straight.

10. A curve approach control apparatus mounted on a vehicle, comprising:
a running condition detecting means for detecting a running condition of said vehicle;
a controlling unit for performing at least one of an alarm control and a deceleration control for a curve in front of said vehicle based on at least said vehicle running condition so as to enable the vehicle to turn into the curve safely;
intersection detecting means for detecting an intersection in the road in front of said vehicle;
deciding means for determining whether a driver intends to travel straight through the intersection or to turn at the intersection by detecting a straight travel state of said vehicle based on said vehicle running condition;
and for determining that the driver intends to travel straight when a straight travel state of said vehicle is detected,
said deciding means determines said straight travel state by comparing an actual measured value of a turning motion parameter of said vehicle and an estimated value of a turning motion parameter estimated from said vehicle speed and a curve's radius of curvature and for determining that the driver intends to travel straight when the actual measured value of a turning motion parameter of said vehicle is less than or equal to the estimated value of the turning motion parameter of the vehicle thereby indicating that a straight travel state is decided by the driver,
wherein said controlling unit, based on said deciding means determining a straight travel state, inhibits the execution of said alarm or deceleration for controlling said vehicle when the driver intends to travel straight through said intersection.

11. The curve approach control apparatus according to claim 10, wherein
said intersection detecting means includes
a navigation device for storing road information within a set range of vehicle travel route in front of said vehicle and for directing the driver, wherein said controlling unit inhibits an execution of controlling said vehicle when said deciding means determines that the driver intends to travel straight through said intersection even if said navigation device directs the driver to turn at said intersection instead of going straight.

12. The curve approach control apparatus according to claim 11, wherein said straight travel state is detected by comparing an actual detected value of turning motion parameter of an estimated value of turning motion estimated based on said vehicle running condition and a curve's radius of said intersection calculated based on the road map information.

13. The curve approach control apparatus according to claim 11, wherein said deciding means determines that the driver intends to travel straight through the intersection when said vehicle is in an accelerating state at a predetermined range in front of the intersection.

14. The curve approach control apparatus according to claim 11, wherein said deciding means determines that the driver intends to travel straight through the intersection based on said straight travel state and when said vehicle is in an accelerating state at a perdetermined range in front of the intersection, wherein said straight travel state is detected by comparing an actual detected value of turning motion parameter of an estimated value of turning motion estimated based on said vehicle running condition and a radius of said curve of said intersection calculated based on the road map information.

15. The curve approach control apparatus according to claim 10, wherein said intersection detecting means includes a navigation device for storing road information within a set range of vehicle travel route in front of said vehicle and for directing the driver, a road shape detection device for detecting road shape including at least a position of an intersection ahead of said vehicle by processing an image of the road in front of said vehicle taken by a pair of cameras, wherein said deciding means determines whether the driver intends to travel straight through said intersection or to turn at said intersection when the output information about the intersection from both said navigation device and the road shape detection device coincides with each other.

* * * * *